United States Patent
Becker et al.

(10) Patent No.: US 6,178,152 B1
(45) Date of Patent: Jan. 23, 2001

(54) DEVICE FOR PLAYING COMPACT DISKS

(75) Inventors: Volker Becker; Anton Mindl, both of Hildesheim; Thomas Westendorf, Harsum; Holger Zimmermann, Hildesheim, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/171,276

(22) PCT Filed: Jan. 30, 1998

(86) PCT No.: PCT/DE98/00265

§ 371 Date: Aug. 18, 1999

§ 102(e) Date: Aug. 18, 1999

(87) PCT Pub. No.: WO98/36412

PCT Pub. Date: Aug. 20, 1998

(30) Foreign Application Priority Data

Feb. 14, 1997 (DE) .............................. 197 05 624

(51) Int. Cl.[7] .................................... G11B 17/26
(52) U.S. Cl. ............................... 369/178; 369/36
(58) Field of Search ................. 369/34, 36, 38, 369/39, 178, 179, 191, 192, 289, 291

(56) References Cited

U.S. PATENT DOCUMENTS

| | | | |
|---|---|---|---|
| 4,730,292 | * 3/1988 | Hasegawa et al. | 369/36 |
| 4,752,920 | * 6/1988 | D'Alayer De Costemore D'Arc | 369/33 |
| 5,099,466 | * 3/1992 | Kimura et al. | 369/36 |
| 5,532,985 | * 7/1996 | Nakamichi | 369/34 |
| 5,561,657 | * 10/1996 | Ogawa | 369/179 |
| 5,781,523 | * 7/1998 | Ozawa et al. | 369/77.1 |

FOREIGN PATENT DOCUMENTS

| 4406078 | * 1/1995 | (DE) . |
|---|---|---|
| 614182 | * 9/1994 | (EP) . |

* cited by examiner

Primary Examiner—David L. Ometz
(74) Attorney, Agent, or Firm—Kenyon & Kenyon

(57) ABSTRACT

A device for playing compact disks, particularly for motor vehicles, including a magazine for a plurality of compact disks that is arranged in and is removable from a housing, and a playback unit for playing a compact disk from the magazine, the playback unit being swing-mounted in the housing separately from the magazine and being adjustable by an adjusting mechanism, is characterized in that the magazine includes a swivel mechanism, which enables at least a portion of the compact disks located in holding compartments of the magazine to swivel away from a compact disk positioned on the playback unit, to form an unencumbered swing space between the compact disk to be played that is positioned on the playback unit and the compact disks arranged in the holding compartments of the magazine.

6 Claims, 2 Drawing Sheets

DEVICE FOR PLAYING COMPACT DISKS

FIELD OF THE INVENTION

The present invention relates to a device for playing compact disks, particularly for motor vehicles, including a magazine for a plurality of compact disks that is arranged in and is removable from a housing, and a playback unit, supported in a freely swinging manner in the housing, for playing a compact disk from the magazine.

BACKGROUND INFORMATION

Devices for playing compact disks, also known as CD changers, are used mainly in motor vehicles, and offer a user-friendly possibility for playing different compact discs from a compact-disk supply stored in the magazine.

Keeping the compact disks available in a magazine permits small dimensions of the total device. Moreover, such a magazine can be fitted with compact disks in an easy, clearly arranged manner. It can also be easily produced.

The magazine and the playback unit directly influence the design of the device for playing compact disks. For example, the external-dimension measurements of the entire device, the resistance to vibration and the manufacturing expenditure are essentially dependent on the design and mounting of the magazine and the playback unit.

Devices for playing compact disks for motor vehicles are known, in which both the magazine and the playback unit and its adjusting mechanism are rigidly coupled during the operation of the device, and this total unit is suspended in a freely swinging manner with respect to the housing (compare FIG. 2). This type of suspension permits a relatively narrow type of construction of the device for playing compact disks, since a compact disk to be played does not have to be pulled completely out of the magazine, and therefore only has to carry out small movements. Since, however, an unencumbered swing space is necessary even for these movements, individual compartments of the magazine must have a relatively great height, which in turn leads to a great overall height of the total device. Moreover, the resistance to vibrations is problematical in such a device, since the playback unit is not decoupled, e.g., by an elastic suspension mount or the like, from the remaining mechanism which is susceptible to vibrations.

To meet this problem, conventional systems elastically suspend only the actual playback unit. The advantage of such devices is elastic decoupling from the mechanism susceptible to vibrations. Moreover, the playback unit also has a very close structural relationship to devices for playing single compact disks, so-called single disk drives. By slight modification, these disk drives can be employed for insertion in devices for playing compact disks in CD changers.

One specific embodiment of such a conventional device for playing compact disks includes a magazine, rigidly supported in the housing, having relatively narrow holding compartments for the compact disks. To play a compact disk, it is completely pulled out of the magazine, so that the necessary unencumbered movement or swing space is assured in each case for the compact disk. To be sure, this specific embodiment permits a relatively flat, but at the same time very wide design of the entire device.

In another conventional device for playing compact disks, in which only the playback unit is elastically supported, provision is made for a push-action magazine, in which case those compact disks which lie opposite the playback unit during the playing of a compact disk can be pushed out of the way of the compact disk to be played, in order to form an unencumbered swing space for the compact disk that is to be played. Such a device requires that the magazine be equipped with an appropriate translatory shifting mechanism. Problematical in this case, is that a very costly mechanism is necessary for such a magazine construction, particularly if the intention is to keep the external-dimension measurements of the whole device compact.

SUMMARY OF THE INVENTION

Therefore, an object of the present invention is to improve a device for playing compact disks that permits resistance of the entire device to vibrations to the greatest extent possible, while providing small external-dimension measurements, and low manufacturing expenditure.

This object is achieved according to the present invention by providing a device for playing compact disks, particularly for motor vehicles, within which the magazine includes a swivel mechanism which enables at least a portion of the compact disks located in the magazine to swing out of the way of a compact disk located on the playback unit, to form an unencumbered swing space between the compact disk located on the playback unit and the compact disks arranged in the magazine.

Swinging at least one portion of the compact disks away from the compact disk which is positioned on the playback unit has the particularly great advantage that the entire device has only a small housing width and a small housing height, since the holding compartments, as also the magazine itself, can be very compact because of the swivel mechanism. Moreover, such a swivel mechanism is structurally relatively easy to implement. In addition, the device allows the use of a playback unit which exhibits great conformity with single disk drives. This permits the use of modified single disk drives, which means the production costs for the entire device can be kept low.

Moreover, while supplying it with compact disks, it is possible to "leaf through" the magazine, similar to a book, thus allowing an immediate overall view of the compact disks in the magazine.

The swivel mechanism can be designed in many different ways. A particularly advantageous specific embodiment, because easy to implement, provides for the swivel mechanism to have in each case at least one folding hinge, which enables each holding compartment for the compact disks to swivel.

Another advantageous specific embodiment, in which the space requirement in particular is further reduced in the swivelled state of the magazine, provides that in each case two folding hinges are arranged on the side of the magazine facing away from the playback unit, in such a way that the holding compartments of the compact disks are supported essentially in parallel to one another and to the compact disk positioned on the playback unit, and are able to swivel in the shape of a parallelogram.

Different specific embodiments are conceivable with regard to the swivelling of the holding compartments. Thus, for example, the swivelling can be carried out manually. One advantageous specific embodiment provides that the holding compartments are able to be swivelled by servomotors.

The magazine can be secured to the housing in different ways. However, preferably the magazine is rigidly attached to one wall of the housing.

Particularly with respect to an interference-free and manipulable operation, it is preferably also provided that, given a magazine removed from the housing, the swivel mechanism is manually or automatically lockable/releasable.

DETAILED DESCRIPTION OF THE PREFERRED EMBODIMENTS

Figure 3:
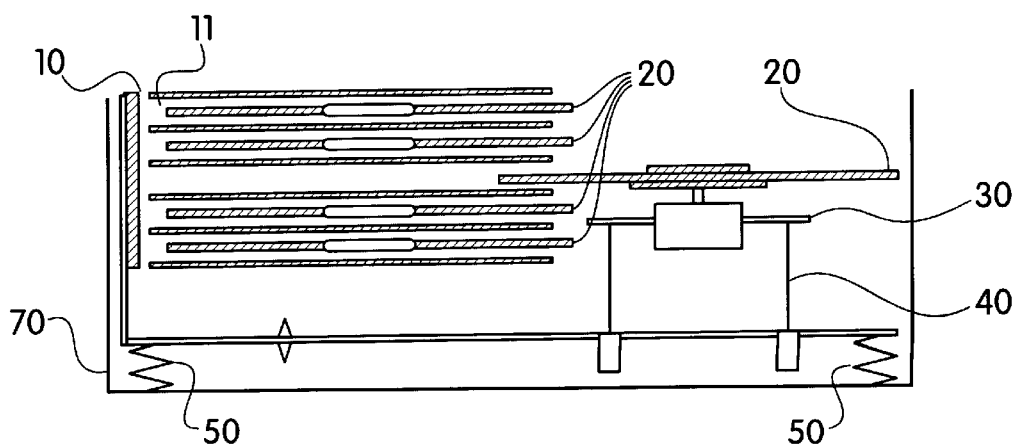
FIG. 3 Shows a partially cut-off side view of a conventional device for playing compact disks.

A conventional device for playing compact disks is shown in FIG. 3.

As FIG. 3 shows, a magazine, designated as an entirety by 10, for compact disks 20, together with a playback unit 30 and its adjusting mechanism 40, is supported in a freely swinging manner, e.g., by way of springs 50, in a housing 70 of the device for playing compact disks 20. Magazine 10 includes holding compartments 11 for accommodating compact disks 20, the compartments being relatively high so that for instance, if the whole device, which is preferably used in motor vehicles, vibrates, compact disks 20 are prevented from bumping against the walls of holding compartments 11.

In such de-ices for playing compact disks 20, the high magazine 10, due to the high holding compartments 11, is problematic. Also, the mechanics of magazine 10, playback unit 30 and adjusting mechanism 40, which are quite susceptible to oscillations, have a disadvantageous effect on a trouble-free operation of the device with respect to the resistance of the entire device to vibrations.

Figure 4:
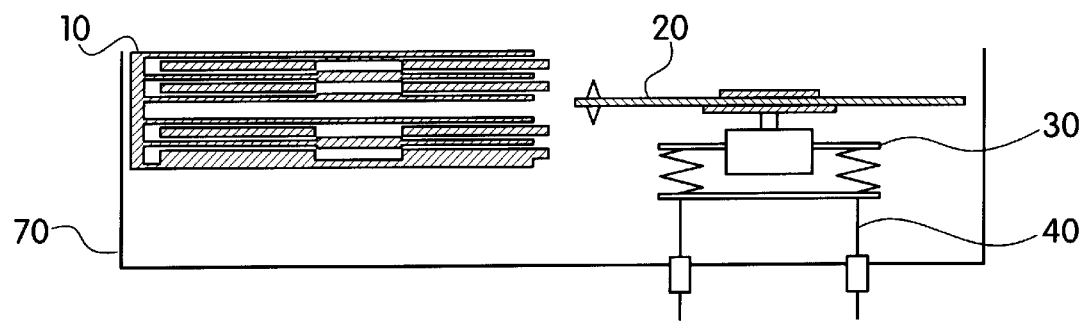
FIG. 4 Shows a another partially cut-off side view of a conventional device for playing compact disks.
Figure 5:
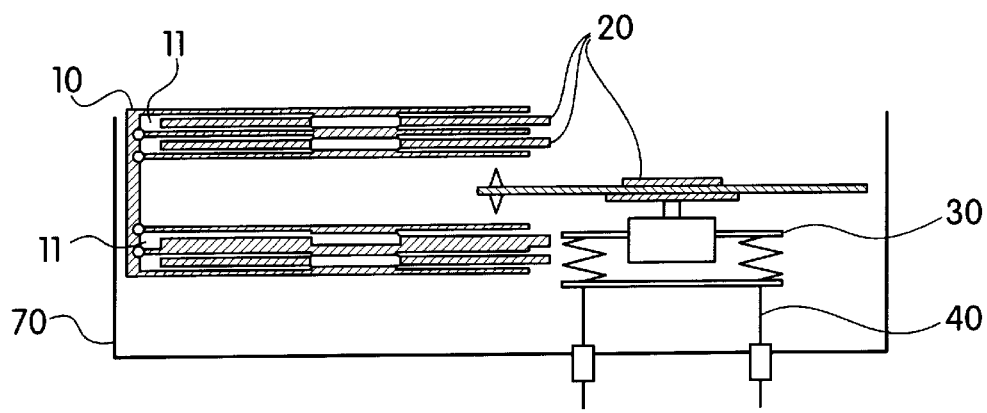
FIG. 5 Shows a partially cut-off side view of a another conventional device for playing compact disks.

In other conventional devices for playing compact disks, shown in FIG. 4 and FIG. 5, only playback unit 30 is swing-mounted, whereas adjusting mechanism 40 and magazine 10 are rigidly supported in housing 70.

In the device shown in FIG. 4 for playing compact disks, one compact disk 20 is completely pulled out for playing from its holding compartment 11, which in this device, has only a small overall height.

It may be that by this means, a small overall height of housing 70 is made possible. However, this is only possible because the housing is relatively wide. This is because playback unit 30 must be so far removed from magazine 10 that, given a compact disk 20 that is to be played, sufficient swing space is available. Therefore, compact disk 20 to be played must be completely separated spatially from magazine 10, so that the housing width must be greater than double the diameter of a compact disk 20.

On the other hand, in the case of another conventional device (FIG. 5), magazine 10 is designed as a push-action magazine, which permits shifting compact disks 20 in the vertical direction, so that sufficient swing space is available for a compact disk to be played that is positioned on playback unit 30. It may be that such a device permits compact external-dimension measurements. However, because a vertical movement of holding compartments 11 must be combined with a horizontal movement of compact disks 20 in order to convey them to playback unit 30, a costly shifting mechanism is necessary which, not only permits a horizontal movement of individual compact disk 20, but also permits a vertical movement of one or more holding compartments 11.

Figure 1:
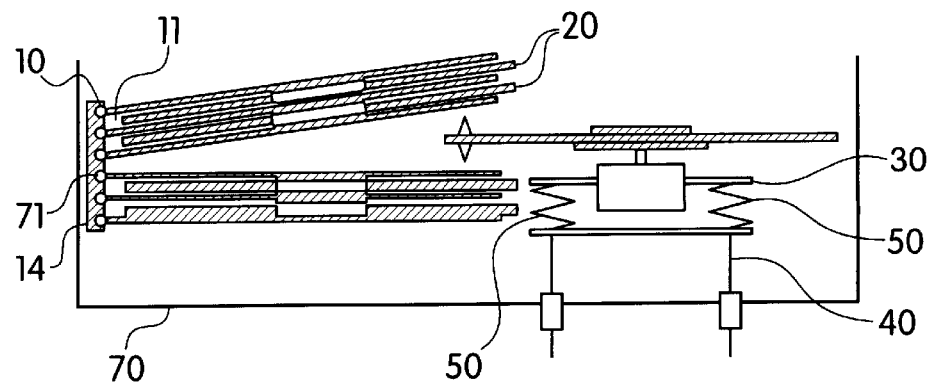
FIG. 1 Shows a partially cut-off side view of an exemplary embodiment of a device according to the present invention for playing compact disks.

A device according to the present invention in which the above-mentioned problems do not occur is shown in FIG. 1. As FIG. 1 shows, magazine 10 is arranged on a housing wall 71 of housing 70 of the device. Playback unit 30 is swing-mounted by way of springs 50, and is adjustable in the vertical direction by an adjusting mechanism 40 which is likewise secured in housing 70.

Magazine 10 has holding compartments 11 of a small overall height, in which compact disks 20 rest. For playing, a compact disk 20 is removed from a holding compartment 11 and is conveyed to playback unit 30. In order to make available the unencumbered swing space necessary for this compact disk 20 to be played, the magazine has a swivel mechanism in the form of folding hinges 14, which enables holding compartments 11 for compact disks 20 to be swivelled.

Folding hinges 14 are secured to the side of the magazine facing away from playback unit 30 in such a way that holding compartments 11 of compact disks 20 are supported in parallel to one another and to the compact disk to be played that is positioned on playback unit 30.

Holding compartments 11 lying opposite the compact disk to be played are swung out of the way of the compact disk to be played, so that a sufficiently large swing space results in the gap between holding compartments 11 arranged in magazine 10 and holding compartments 11 which are at least partially swivelled.

Figure 2:
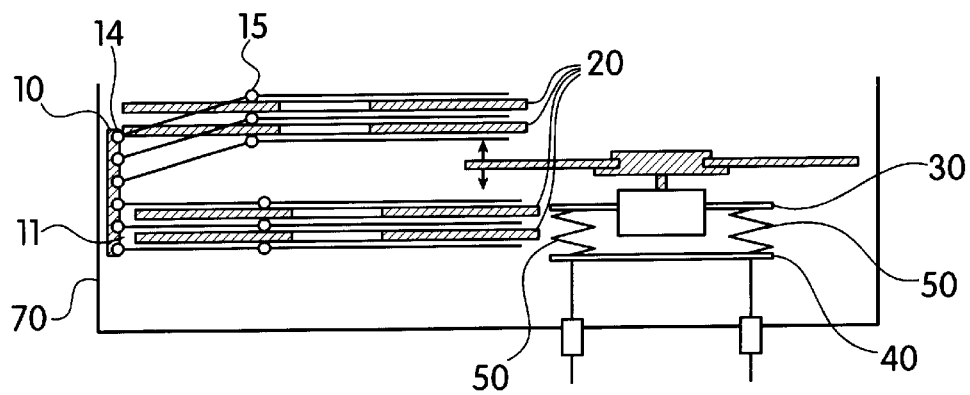
FIG. 2 Shows a partially cut-off side view of another exemplary embodiment of a device according to the present invention for playing compact disks.

The further exemplary embodiment of a device for playing compact disks according to the present invention shown in FIG. 2 differs from that in FIG. 1, in that, besides folding hinges 14, further folding hinges 15 are arranged in such a way that holding compartments 11 of compact disks 20 are supported essentially in parallel to one another and to compact disk 20 positioned on playback unit 30, both in the swivelled and in the non-swivelled state, and are able to swivel in the shape of a parallelogram, so that even swivelled compact disks 20 are arranged essentially in parallel, and therefore in a particularly space-saving manner, with respect to the compact disk positioned on playback unit 30.

In both exemplary embodiments, the swivelling is so great that, given a removed magazine, the opening angle of the swivel mechanism suffices in order to recognize the type of compact disks 20 arranged in holding compartments 11, without removing the individual compact disks.

The swivelling of a portion or of all holding compartments 11 is carried out by servomotors.

Given a magazine 10 removed from housing 70, the swivelling mechanism is manually or automatically lockable and releasable.

Of course, not just one portion of compact disks 20 arranged in holding compartments 11 can be swivelled, as was explained above and is shown in FIG. 1. Rather, it is also possible to swivel both the holding compartments 11 arranged above the compact disk positioned in playback unit 30, and holding compartments 11 arranged below this compact disk 20 to be played, thus permitting a particularly large unencumbered swing space.

What is claimed is:

1. A device for playing compact disks, comprising:

a housing;

a magazine removably mounted in the housing and including a swivel mechanism on a side of the magazine facing away from the playback unit and holding compartments, the holding compartments for holding compact disks; and a playback unit for playing one of the compact disks, the playback unit being swing-mounted in the housing separately from the magazine and being adjustable by an adjusting mechanism, the swivel mechanism enabling at least one of the compact disks held in the holding compartments to swivel away from one of the compact disks positioned on the playback unit forming an unencumbered switch space between the one of the compact disks positioned on the playback unit and the compact disks arranged in the holding compartments of the magazine, the swivel mechanism including a first folding hinge for each of the holding compartments that allows each of the holding compartments to be swiveled, the first folding hinge being secured to the side of the magazine facing away from the playback unit.

2. The device according to claim 1, wherein the swivel mechanism includes a second folding hinge for each of the holding compartments arranged on the side of the magazine facing away from the playback unit, the folding hinges supporting each of the holding compartments in parallel to one another and to the one of the compact disks positioned on the playback unit, the holding compartments swiveling in a shape of a parallelogram.

3. The device according to claim 1, further comprising:

a servomotor swiveling the at least one of the compacts disks held in the holding compartments.

4. The device according to claim 1, wherein the magazine is rigidly secured to one wall of the housing.

5. The device according to claim 1, wherein the swivel mechanism is one of manually and automatically lockable and releasable.

6. The device according to claim 1, wherein the device is for mounting in a motor vehicle.

* * * * *